US012804530B2

(12) United States Patent
Cakulev et al.

(10) Patent No.: US 12,804,530 B2
(45) Date of Patent: Nov. 17, 2026

(54) METHOD AND SYSTEM FOR DATA NETWORK NAME REPLACEMENT

(71) Applicant: Verizon Patent and Licensing Inc., Basking Ridge, NJ (US)

(72) Inventors: Violeta Cakulev, Millburn, NJ (US); Hossein M. Ahmadi, Parsippany, NJ (US); Ali Imdad Malik, East Brunswick, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 342 days.

(21) Appl. No.: 18/432,221

(22) Filed: Feb. 5, 2024

(65) Prior Publication Data

US 2025/0254608 A1 Aug. 7, 2025

(51) Int. Cl.
*H04W 48/18* (2009.01)
*H04W 48/16* (2009.01)

(52) U.S. Cl.
CPC .......... *H04W 48/18* (2013.01); *H04W 48/16* (2013.01)

(58) Field of Classification Search
CPC .............................. H04W 48/18; H04W 48/16
See application file for complete search history.

(56) References Cited

U.S. PATENT DOCUMENTS

2021/0212136 A1* 7/2021 Lee .................... H04L 41/0894
2024/0365102 A1* 10/2024 Mohan Raj ............ H04W 8/02
2025/0088849 A1* 3/2025 Hong ................... H04W 12/10

* cited by examiner

*Primary Examiner* — Kiet Tang

(57) ABSTRACT

A method, a network device, and a non-transitory computer-readable storage medium are described in relation to a data network name (DNN) replacement service. The DNN replacement service may be provided in a roaming context associated with an end device. The DNN replacement service may be implemented by a network device of a home core network of the end device. The network device may obtain a policy pertaining to a session establishment between a visited core network and a home core network. The network device may determine whether DNN replacement is applicable based on the policy. The network device may modify a message to establish the session creation by including a replacement DNN when DNN replacement is applicable.

20 Claims, 5 Drawing Sheets

METHOD AND SYSTEM FOR DATA NETWORK NAME REPLACEMENT

BACKGROUND

Development and design of networks present certain challenges from a network-side perspective and an end device perspective. For example, Next Generation (NG) wireless networks, such as Fifth Generation New Radio (5G NR) networks are being deployed and are under development. Given the mobility of end devices, networks support various roaming scenarios, such as local breakout roaming and home routed roaming, for example.

DETAILED DESCRIPTION

The following detailed description refers to the accompanying drawings. The same reference numbers in different drawings may identify the same or similar elements. Also, the following detailed description does not limit the invention.

A policy control function (PCF) may provide access and mobility-related policy control information to an access and mobility function (AMF). For example, during end device registration, access and mobility policy association may be established and may allow the PCF to control service area restrictions, specify spectrum permissions, and so forth. According to some scenarios, the PCF may provide DNN replacement information to the AMF. For example, an end device may operate using local configurations. According to another example, operator policies may be used to replace an end device requested DNN with another DNN, which may be used only internally in the network.

During the end device registration procedure, the PCF, such as an access and mobility (AM) PCF may indicate policies to be used for DNN replacement for the end device to the AMF, for example. If the DNN requested by the end device is indicated for replacement, the AMF may communicate with the AM PCF to perform DNN replacement during a packet data unit (PDU) Session Establishment procedure. However, in roaming scenarios, DNN replacement is not offered and/or addressed in the art.

According to exemplary embodiments, a DNN replacement service is described herein. According to an exemplary embodiment, the DNN replacement service may be implemented in a routing scenario, such as a home-routed roaming scenario.

According to an exemplary embodiment, a network device provides the DNN replacement service. For example, the network device may be implemented as a security edge protection proxy (SEPP) device or similar functioning device, as described herein. According to an exemplary embodiment, the SEPP device, such as a home SEPP (H-SEPP), may intercept a message from a visited AMF (V-AMF) to a home session management function (H-SMF). For example, the message may be implemented as a discovery request. In response, the H-SEPP may discover the home AM PCF (H-AM PCF) and may obtain DNN replacement information from the H-AM PCF. According to an exemplary embodiment, the H-SEPP may use the selected DNN to discover the H-SMF.

According to an exemplary embodiment, when the V-AMF initiates a creation of a PDU session towards the H-SMF, the H-SEPP may intercept a PDU session create message. The H-SEPP may check the DNN included in the PDU session create message and may determine whether the DNN should be changed based on the DNN replacement information. Based on the result of the determination, the H-SEPP may change the DNN with the replacement DNN.

In view of the foregoing, a network may provide DNN replacement for end devices in roaming scenarios. In this way, the network may provide DNN replacement in roaming and non-roaming scenarios.

Figure 1:
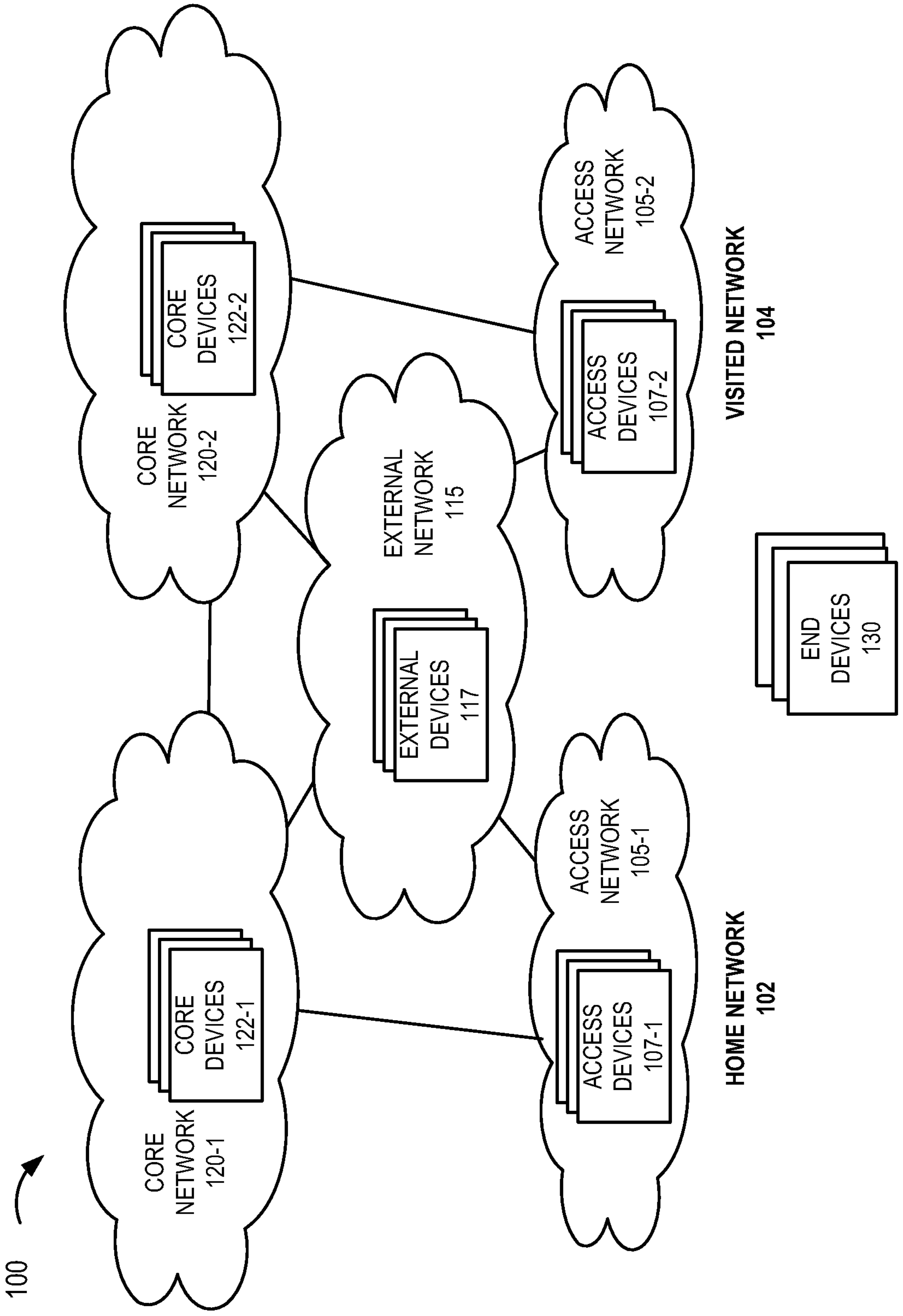
FIG. 1 is a diagram illustrating an exemplary environment in which an exemplary embodiment of a data network name (DNN) replacement service may be implemented.

FIG. 1 is a diagram illustrating an exemplary environment 100 in which an exemplary embodiment of a DNN replacement service may be implemented. As illustrated, environment 100 includes a home network 102 and a visited network 104. Home network 102 may include an access network 105-1 and a core network 120-1. Visited network 104 may include an access network 105-2 and a core network 120-2. Access network 105-1 includes access devices 107-1 (also referred to individually or generally as access device 107-1) and access network 105-2 includes access devices 107-2 (also referred to individually or generally as access device 107-2). Core network 120-1 includes core devices 122-1 (also referred to individually or generally as core device 122-1) and core network 120-2 includes core devices 122-2 (also referred to individually or generally as core device 122-2). For purposes of description, access device 107-1 and access device 107-2 may also be referred to more generally as access device 107, and core device 122-1 and core device 122-2 may also be referred to more generally as core device 122. Environment 100 may further include an external network 115 that includes external devices 117 (also referred to individually or generally as external device 117). According to various exemplary embodiments, external network 115 may be included in home network 102, visited network 104, both, or neither, as described herein. Environment 100 may also include end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 (e.g., X-haul networks, etc.) may be included that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), and a network management plane. Environment 100 may include other types of planes of communication. A message communicated in support of the DNN replacement service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., proprietary, etc.).

Home network 102 may include a network of a (home) operator to which users associated with end devices 130 may subscribe. Visited network may include a network that users or subscribers via end devices 130 may temporarily roam which may be outside home network 102.

Access network 105 may include one or multiple networks of one or multiple types and technologies. For example, access network 105 may be implemented to include a Fifth Generation (5G) RAN, a future generation RAN (e.g., a Sixth Generation (6G) RAN, a Seventh Generation (7G) RAN, etc.), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a Next Generation Core (NGC)/5G core network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station).

Access device 107 may include other types of wireless access devices, such as a WiFi device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network (DN), or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, online gaming, web services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and the like. External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a SEPP, a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a wireless access gateway (WAG), a tunnel termination gateway (TTG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW−C), a UPF with PGW user plane functionality (e.g., UPF+PGW−U), and/or other combined nodes (e.g., an HSS with a UDM/UDR, an MME with an AMF, etc.). Also, core devices 122 may include a split core device 122. For example, core devices 122 may include a session management (SM) PCF, an AM PCF, a user equipment (UE) PCF, and/or another type of split architecture associated with another core device 122, as described herein.

According to an exemplary embodiment, at least some of core devices 122 include logic of an exemplary embodiment of the DNN replacement service, as described herein. For example, such core device 122 may be implemented to include a SEPP device or a similar type of network device (e.g., an interworking network device, an edge enforcement function, a proxy device, etc.) that may support communication between home and visited core networks.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, an autonomous vehicle, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
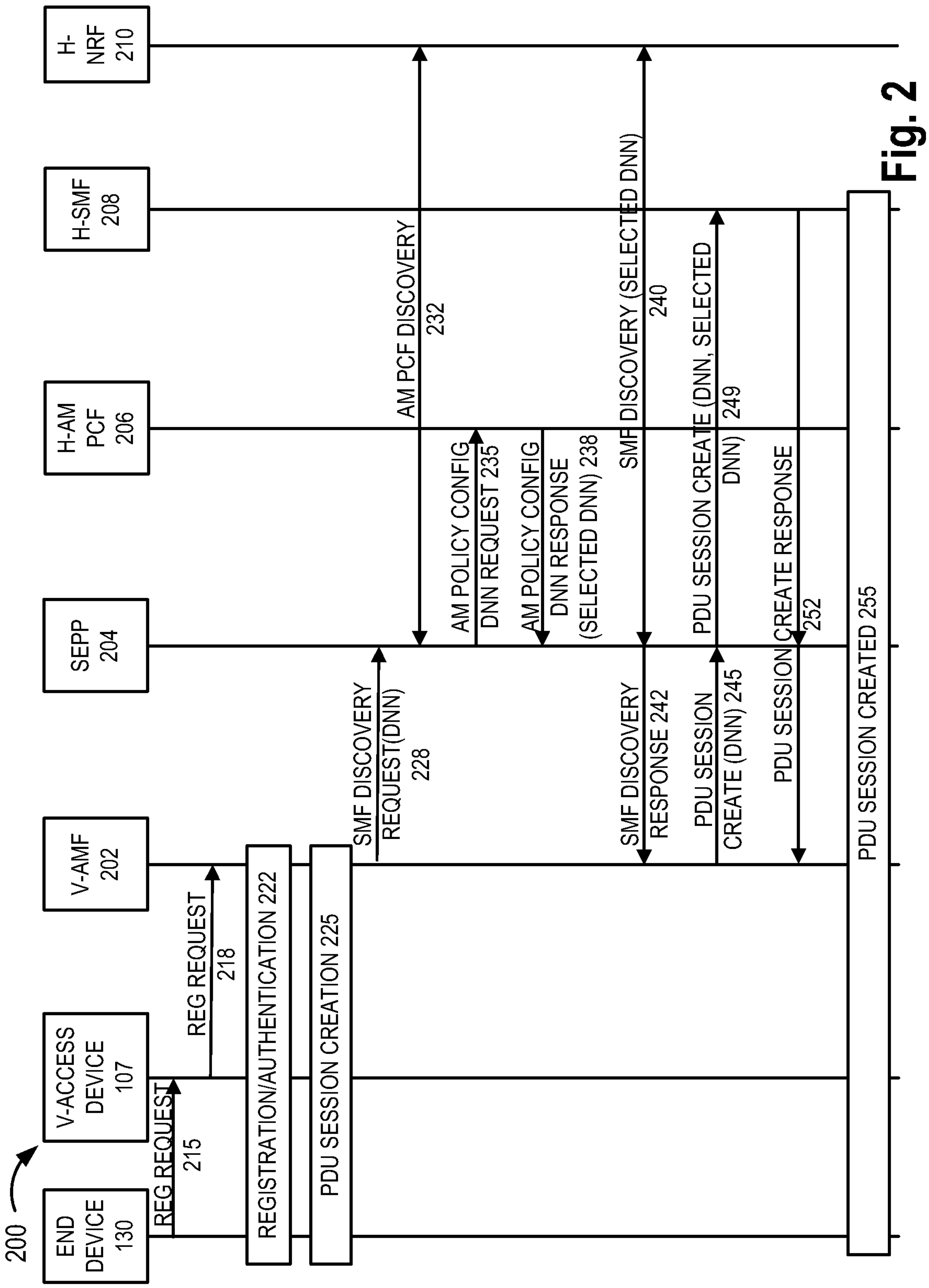
FIG. 2 is a diagram illustrating another exemplary environment in which an exemplary embodiment of the DNN replacement service may be implemented.

FIG. 2 is a diagram illustrating another exemplary environment in which an exemplary process 200 of an exemplary embodiment of the DNN replacement service may be implemented. As illustrated, exemplary environment may include end device 130, a V-access device 107, a V-AMF 202, a SEPP 204, an H-AM PCF 206, an H-SMF 208, and an H-NRF 210. For purposes of description, V-AMF 202 may reside in a visited network (e.g., visited network 104) relative to a home network (e.g., home network 102) of end device 130. SEPP 204, H-AM PCF 206, H-SMF 208, and H-NRF 210 may reside in the home network (e.g., home network 102) of end device 130.

The environment depicted in FIG. 2 is exemplary and according to other embodiments, the environment may include additional, different, and/or fewer network devices. For example, according to other exemplary embodiments, the environment may include another type of core device 122 than those illustrated and described in relation to FIG. 2.

V-AMF 202, SEPP 204, H-AM PCF 206, H-SMF 208, and/or H-NRF 210 may each provide a function and/or a service in accordance with a network standard, such as Third Generation Partnership Project (3GPP), 3GPP2, International Telecommunication Union (ITU), European Telecommunications Standards Institute (ETSI), GSM Association (GSMA), or the like and/or of a proprietary nature. According to an exemplary embodiment, V-AMF 202, SEPP 204, H-AM PCF 206, H-SMF 208, and/or H-NRF 210 may each include logic of an exemplary embodiment of the DNN replacement service and/or provide support for a process of the DNN replacement service. For example, V-AMF 202, SEPP 204, H-AM PCF 206, H-SMF 208, and/or H-NRF 210 may each perform a function, an operation, and/or a service that is beyond a function and/or service associated with the network standard.

According to an exemplary embodiment, process 200 relates to end device 130 and a home-routed roaming context. For example, as described further below and elsewhere, home-routed roaming may include end device 130 registering and authenticating with a visited core network (e.g., V-AMF 202). Control plane messaging between the visited core network and a home core network may include communication via SEPP 204, as illustrated in FIG. 2. Although not illustrated, upstream user plane traffic may traverse the visited core network (e.g., V-UPF or the like (not illustrated)) to the home core network (e.g., H-UPF or the like (not illustrated)) and to a data network or other type of end device application layer network (not illustrated), and/or downstream user plane traffic may traverse in the opposite direction along the same path, for example. The data network or the like may be a replaced data network relative to an originally requested DNN of end device 130 based on the DNN replacement service, as described herein. The messages described and illustrated are exemplary. Additionally, some message that may occur to establish a PDU session have been omitted for the sake of brevity.

Referring to FIG. 2, although not illustrated, end device 130 may establish a radio resource connection (RRC) with V-access device 107. Thereafter, end device 130 may generate and transmit a registration request 215 to access device 107. Access device 107 may receive, read, and analyze registration request 215, and in response, generate and transmit a registration request 218 to V-AMF 202. In response to receiving and reading and/or analyzing registration request 218, V-AMF 202 and end device 130 may perform a registration and authentication procedure 222. Although not illustrated, the procedure may include communication with other V-core devices 122-2, which have been omitted for the sake of brevity.

According to an exemplary scenario, after successful completion of the registration and authentication procedure 222, end device 130 and V-AMF 202 may perform a PDU session creation procedure 225. For example, although not illustrated, end device 130 may generate and transmit a PDU Session Create Request message to V-AMF 202. The PDU Session Create Request message may include a Subscription Permanent Identifier (SUPI), a DNN, Single-Network Slice Selection Assistance information (S-NSSAI(s)), a PDU Session Identifier, an AMF identifier, a Request Type, User location information, and other information of such message in accordance with a 3GPP or other governing body standard.

Responsive to or as a part of PDU session creation procedure 225, V-AMF 202 may generate and transmit an SMF discovery request 228 to SEPP 204. SMF discovery request 228 may include data requesting a home SMF and the DNN requested by end device 130. In response to receiving and reading and/or analyzing SMF discovery request 228, SEPP 204 may initiate an AM PCF discovery procedure 232 with H-NRF 210. For example, although not illustrated, SEPP 204 may generate and transmit an AM PCF discovery request or query to H-NRF 210. The AM PCF discovery request or query may include data indicating the type of network function requested (e.g., AM PCF (of the home network)). The AM PCF discovery request or query may include other data, such as the DNN, an identifier of end device 130, and so forth. In response to receiving and reading and/or analyzing the request or query, H-NRF 210 may perform a lookup and identify the appropriate AM PCF, and provide indications or information pertaining to the requested type of network function (e.g., AM PCF, such as H-AM PCF 206) to SEPP 204 in a discovery response.

In response to receiving and reading the discovery response, SEPP 204 may generate and transmit an AM policy configuration DNN request 235 to the identified H-AM PCF 206. In this way, SEPP 204 may determine whether or not the requested DNN by end device 130 is to be replaced or not. DNN request 235 may include an identifier of end device 130. According to various exemplary implementations, DNN request 235 may or may not include the requested DNN. In response to receiving and reading and/or analyzing DNN request 235, H-AM PCF 206 may select policy information. For example, the policy information may include information relating to DNN replacement for end device 130. H-AM PCF 206 may generate and transmit an AM policy configuration DNN response 238 to SEPP 204. DNN response 238 may include selected DNN information for end device 130.

In response to receiving and reading and/or analyzing DNN response 238, SEPP 204 may determine whether the selected DNN matches the requested DNN or not. For example, SEPP 204 may compare the requested DNN (e.g., received from V-AMF 202) to the selected DNN (e.g., received from H-AM PCF 206). According to this exemplary scenario, assume that the selected DNN and the requested DNN do not match. According to other exemplary scenarios, the selected DNN and the requested DNN may match.

Based on such a determination and responsive to SMF discovery request 228, SEPP 204 may initiate an SMF discovery query procedure 240 with H-NRF 210. For example, although not illustrated, SEPP 204 may generate and transmit an SMF discovery request or query to H-NRF 210. The SMF discovery request or query may include data indicating the type of network function requested (e.g., SMF (of the home network)). The SMF discovery request or query may include other data, such as the selected DNN (instead of the requested DNN), an identifier of end device 130, and so forth. In response to receiving and reading and/or analyzing the request or query, H-NRF 210 may perform a lookup and identify the appropriate SMF, and provide indications or information pertaining to the requested type of network function (e.g., SMF, such as H-SMF 208) to SEPP 204 in a discovery response. H-NRF 210 may select or identify H-SMF 208 based on the selected DNN.

In response to receiving the discovery response, SEPP204 may generate and transmit an SMF discovery response 242 to V-AMF 202. Discovery response 242 may include data indicating or identifying H-SMF 208. In response to receiving and reading and/or analyzing discovery response 242, V-AMF 202 may generate and transmit a PDU session create request 245 to H-SMF 208 via SEPP 204. PDU session create request 245 may include the requested DNN, for example, among other instances of data. In response to receiving and reading and/or analyzing PDU session create request 245, SEPP 204 may generate and transmit a PDU session create request 249, which may include both the requested DNN and the selected DNN, to H-SMF 208. PDU session create request 249 may include PDU session create request 245, in whole or in part. According to other exemplary implementations, SEPP 204 may remove the requested DNN. For example, PDU session create request 249 may not include the requested DNN.

In response to receiving and reading and/or analyzing PDU session create request 249, H-SMF 208 may generate and transmit a PDU session create response 252 to V-AMF 202 via SEPP 204. As illustrated, a PDU session 255 may be created between end device 130 and network devices of the visited network and the home network, such as V-AMF 202, H-SMF 208, etc. Additionally, process 200 may enable DNN replacement in a home-routed roaming context pertaining to end device 130.

FIG. 2 illustrates an exemplary process 200 of an exemplary embodiment of the DNN replacement service, however, according to other exemplary embodiments, process 200 may include additional, different, or fewer operations and/or messages than those illustrated and described. For example, according to another exemplary embodiment, as a part of the PDU session establishment request from end device 130, the message may include data indicating whether or not end device 130 is subject to the DNN replacement service. SMF discovery request 228 may include data indicating that end device 130 is subject to or not subject to the DNN replacement service. Based on this information, when end device 130 is not subject to the DNN replacement service, process 200 may omit operations associated with messages 232, 235, and 238, for example. For example, SEPP 204 may determine to initiate a discovery procedure with H-NRF 210 for the appropriate (home) SMF. Additionally, process 200 may omit providing the selected DNN in message 249.

Figure 3:
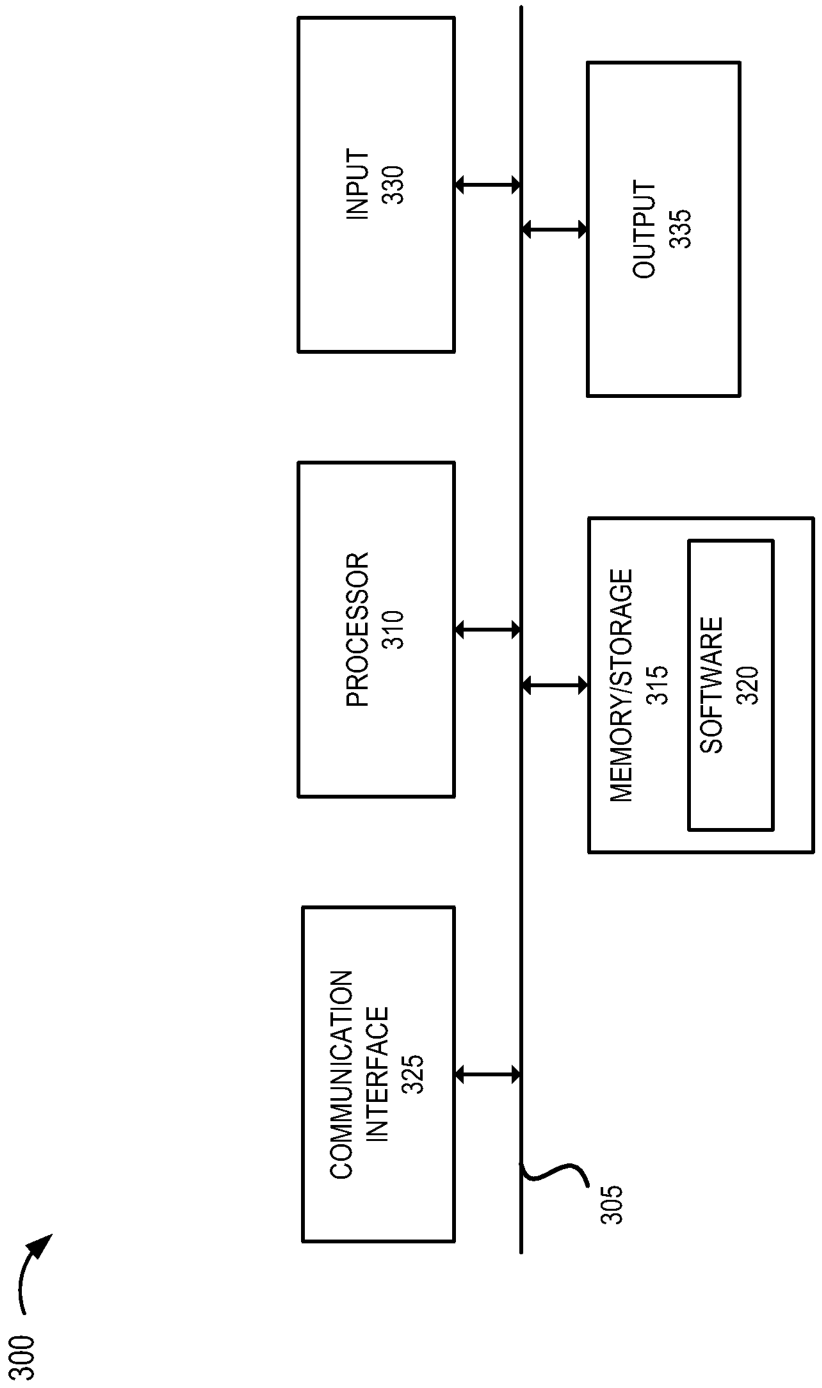
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to SEPP 204 or the like, software 320 may include an application that, when executed by processor 310, provides a function and/or a process of the DNN replacement service, as described herein. According to another example, with reference to core device 122, software 320 may include an application that, when executed by processor 310, provides a function and/or a process of the DNN replacement service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. The protocol stack may include the IP.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 may be configured to perform a function or a process described herein based on the execution of hardware (processor 310, etc.).

Figure 4:
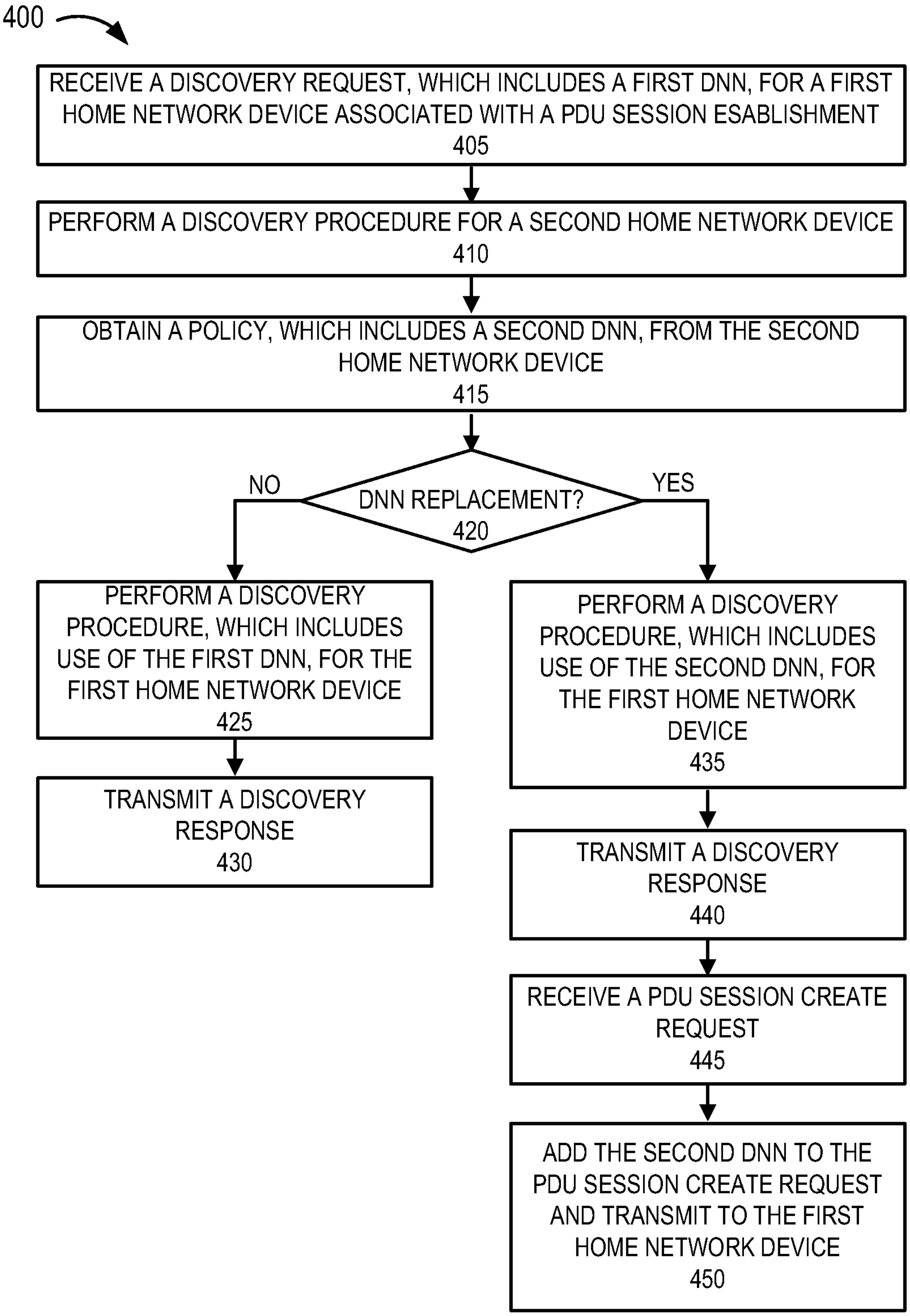
FIG. 4 is a flow diagram illustrating another exemplary process of an exemplary embodiment of the DNN replacement service.

FIG. 4 is a flow diagram illustrating another exemplary process 400 of an exemplary embodiment of the DNN replacement service. According to an exemplary embodiment, SEPP 204 or a similar functioning network device which may support communication (e.g., control plane messaging) between home and visited core networks (referred to generally as a SEPP) may perform a step of process 400. According to an exemplary implementation, processor 310 executes software 320 to perform a step (in whole or in part) of process 400, as described herein. Alternatively, a step (in whole or in part) may be performed by execution of only hardware.

Referring to FIG. 4, in block 405, a SEPP may receive a discovery request, which includes a first DNN, for a first home network device associated with a PDU session establishment procedure. For example, a visited core device 122-2 may transmit the discovery request to discover a home core device 122-1, as described herein.

In block 410, the SEPP may perform a discovery procedure for a second home network device. For example, the SEPP may query an H-NRF to identify an H-PCF device.

In block 415, the SEPP may obtain a policy, which includes a second DNN, from the second home network device. For example, the SEPP may obtain the policy from the H-PCF.

In block 420, the SEPP may determine whether DNN replacement is to be provided. For example, the SEPP may compare the first DNN to the second DNN. When the first DNN matches the second DNN, the SEPP may determine that there is no DNN replacement (block 420-NO), and when the first DNN does not match the second DNN, the SEPP may determine that there is DNN replacement (block 420-YES).

Referring to when DNN replacement is not determined, in block 425, the SEPP may perform a discovery procedure, which includes use of the first DNN, for the first home network device. For example, the SEPP may query the H-NRF to identify an H-SMF associated with the first DNN.

In block 430, the SEPP may transmit a discovery response. For example, the SEPP may transmit information, which identifies the H-SMF, to visited core device 122-2.

Referring to when DNN replacement is determined, in block 435, the SEPP may perform a discovery procedure, which includes use of the second DNN, for the first home network device. For example, the SEPP may query the H-NRF to identify an H-SMF associated with the second DNN.

In block 440, the SEPP may transmit a discovery response. For example, the SEPP may transmit information, which identifies the H-SMF, to visited core device 122-2.

In block 445, the SEPP may receive a PDU session create request. For example, the SEPP may receive the PDU session create request from visited core device 122-2. The PDU session create request may include the first DNN.

In block 450, the SEPP may add the second DNN to the PDU session create request, and transmit to the first home network device. For example, the SEPP may transmit the PDU session create request to the H-SMF.

FIG. 4 illustrates an exemplary process 400 of the DNN replacement service, however, according to other exemplary embodiments, the DNN replacement service may perform additional operations, fewer operations, and/or different operations than those illustrated and described in relation to FIG. 4. For example, process 400 may include the establishment of the PDU session between core devices of the visited and home networks via the SEPP. Additionally, process 400 may include the establishment of a PDU session on the user plane between end device 130 and the first DNN or the second DNN via the visited and core networks.

Figure 5:
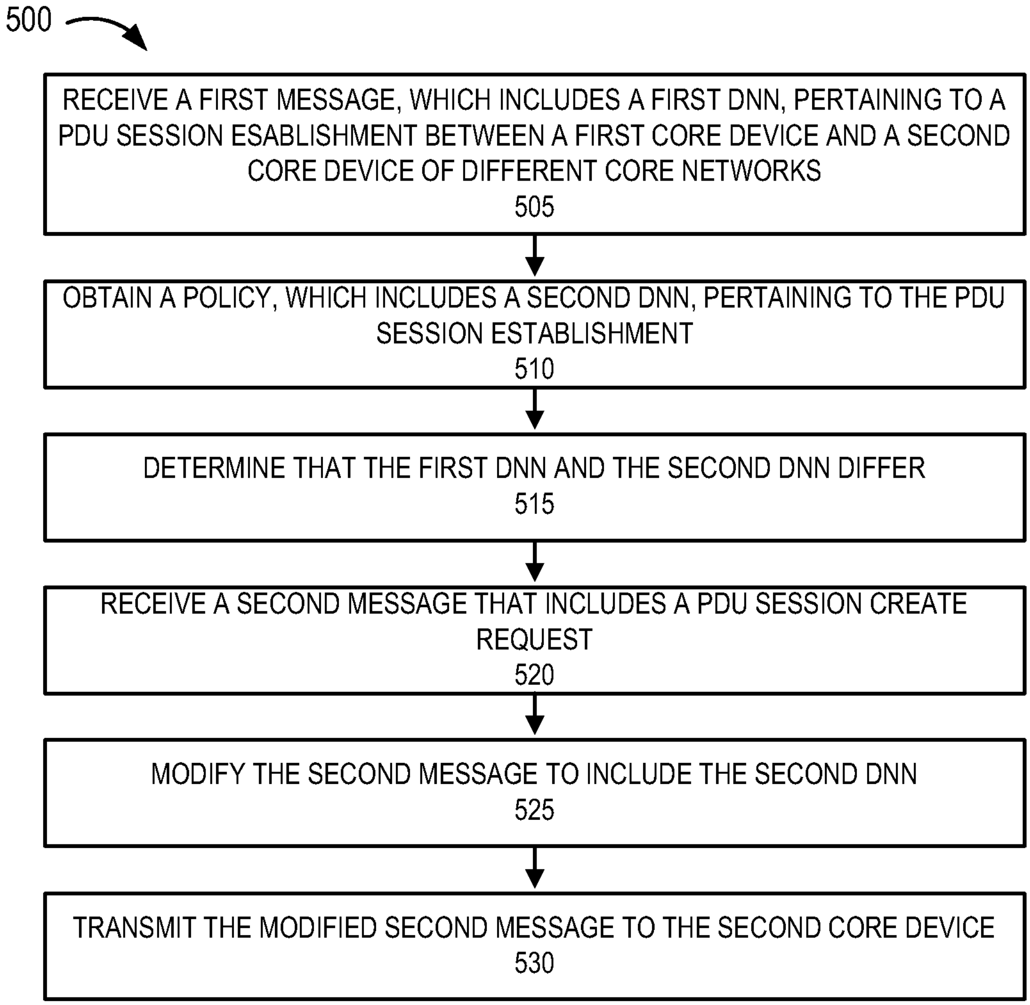
FIG. 5 is another flow diagram illustrating another exemplary process of an exemplary embodiment of the DNN replacement service.

FIG. 5 is another flow diagram illustrating another exemplary process 500 of an exemplary embodiment of the DNN replacement service. According to an exemplary embodiment, SEPP 204 or a similar functioning network device which may support communication (e.g., control plane messaging) between home and visited core networks (referred to generally as a SEPP) may perform a step of process 500. According to an exemplary implementation, processor 310 executes software 320 to perform a step (in whole or in part) of process 400, as described herein. Alternatively, a step (in whole or in part) may be performed by execution of only hardware.

In block 505, a SEPP may receive a first message, which includes a first DNN, pertaining to a PDU session establishment between a first core device and a second core device of different core networks. For example, the first core device may be of the visited network, and the second core network may be of the home network, as described herein.

In block 510, the SEPP may obtain a policy, which includes a second DNN, pertaining to the PDU session establishment. In block 515, the SEPP may determine that the first DNN and the second DNN differ. For example, the SEPP may compare the first DNN of the first message with the second DNN of the policy. In block 520, the SEPP may receive a second message that includes a PDU session create request. For example, the PDU session create message may pertain to the first core device and the second core device. In block 525, the SEPP may modify the second message to include the second DNN. For example, the SEPP may determine that DNN replacement is to be provided based on the block 515.

In block 530, the SEPP may transmit the modified second message. For example, the SEPP may transmit the modified second message to the first core device of the home network, as described herein.

FIG. 5 illustrates an exemplary process 500 of the DNN replacement service, however, according to other exemplary embodiments, the DNN replacement service may perform additional operations, fewer operations, and/or different operations than those illustrated and described in relation to FIG. 5. For example, process 400 may include the establishment of the PDU session between core devices of the visited and home networks via the SEPP. Additionally, process 400 may include the establishment of a PDU session on the user plane between end device 130 and the first DNN or the second DNN via the visited and home core networks.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

receiving, by a network device of a first core network from a second network device of a second core network, a first message, which includes a first data network name (DNN), pertaining to a packet data unit (PDU) session creation procedure with a third network device of the first core network;

obtaining, by the network device, a policy, which includes a second DNN, that pertains to the PDU session creation procedure;

determining, by the network device, that the second DNN differs from the first DNN;

receiving, by the network device from the second network device, a second message to create a PDU session with the third network device;

modifying, by the network device, the second message to include the second DNN; and transmitting, by the network device to the third network device, the modified second message.

2. The method of claim 1, further comprising:

performing, by the network device in response to the receiving of the first message, a discovery procedure for a policy control device of the first core network that stores the policy.

3. The method of claim 1, further comprising:

performing, by the network device in response to the determining, a discovery procedure for the third network device based on the second DNN.

4. The method of claim 3, further comprising:

transmitting, by the network device to the second network device, a third message that identifies the third network device.

5. The method of claim 1, further comprising:

establishing via the network device a PDU session between the second network device and the third network device.

6. The method of claim 1, further comprising:

establishing a PDU session between an end device and a network device of the second DNN.

7. The method of claim 1, wherein the PDU session creation procedure relates to an end device in a home-routed roaming context, and wherein the first core network is a home network of the end device and the second core network is a visited network.

8. The method of claim 1, wherein the network device includes a security edge protection proxy device.

9. A network device comprising:

a processor, wherein the processor is configured to:

receive from a second network device of a second core network, a first message, which includes a first data network name (DNN), pertaining to a packet data unit (PDU) session creation procedure with a third network device of a first core network, wherein the network device is of the first core network;

obtain policy, which includes a second DNN, that pertains to the PDU session creation procedure;

determine that the second DNN differs from the first DNN;

receive from the second network device, a second message to create a PDU session with the third network device;

modify the second message to include the second DNN; and transmit to the third network device, the modified second message.

10. The network device of claim 9, wherein the processor is further configured to:

perform, in response to receiving the first message, a discovery procedure for a policy control device of the first core network that stores the policy.

11. The network device of claim 9, wherein the processor is further configured to:

perform, in response to the determination that the second DNN differs, a discovery procedure for the third network device based on the second DNN.

12. The network device of claim 11, wherein the processor is further configured to:

transmit, to the second network device, a third message that identifies the third network device.

13. The network device of claim 9, wherein the processor is further configured to:

establish a PDU session between the second network device and the third network device.

14. The network device of claim 9, wherein the processor is further configured to:

establish a PDU session between an end device and a network device of the second DNN.

15. The network device of claim 9, wherein the PDU session creation procedure relates to an end device in a home-routed roaming context, and wherein the first core network is a home network of the end device and the second core network is a visited network.

16. The network device of claim 9, wherein the network device includes a security edge protection proxy device.

17. A non-transitory computer-readable storage medium storing instructions executable by a processor of a network device of a first core network, wherein the instructions are configured to:

receive from a second network device of a second core network, a first message, which includes a first data network name (DNN), pertaining to a packet data unit (PDU) session creation procedure with a third network device of the first core network;

obtain policy, which includes a second DNN, that pertains to the PDU session creation procedure;

determine that the second DNN differs from the first DNN;

receive from the second network device, a second message to create a PDU session with the third network device;

modify the second message to include the second DNN; and transmit to the third network device, the modified second message.

18. The non-transitory computer-readable storage medium of claim 17, wherein the instructions are further configured to:

establish a PDU session between the second network device and the third network device.

19. The non-transitory computer-readable storage medium of claim 17, wherein the instructions are further configured to:

perform, in response to receiving the first message, a discovery procedure for a policy control device of the first core network that stores the policy.

20. The non-transitory computer-readable storage medium of claim 17, wherein the instructions are further configured to:

perform, in response to the determination that the second DNN differs, a discovery procedure for the third network device based on the second DNN.

* * * * *